Aug. 7, 1962 W. E. GOURLAY 3,047,976
LIVE BAIT HOLDER
Filed April 18, 1961
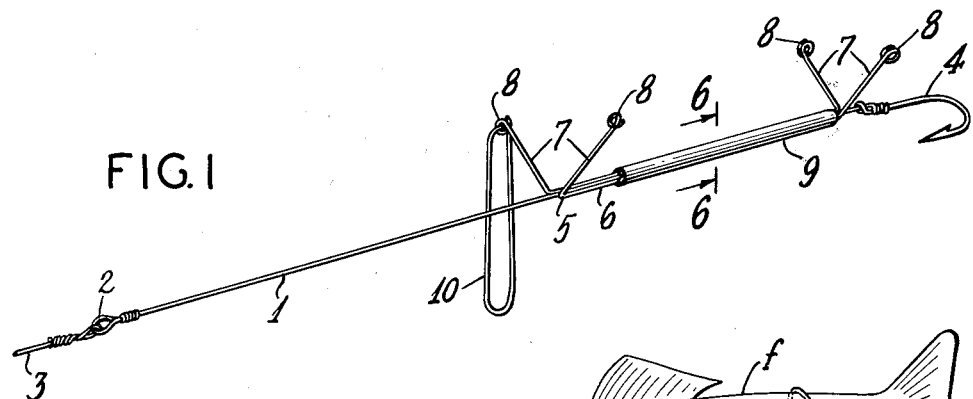
FIG. 1
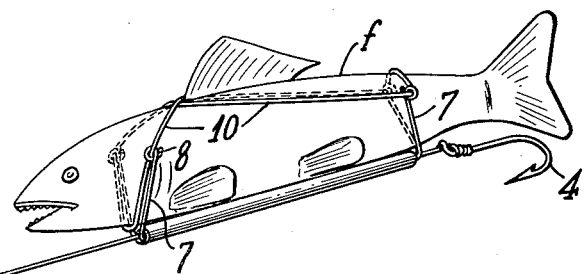
FIG. 2
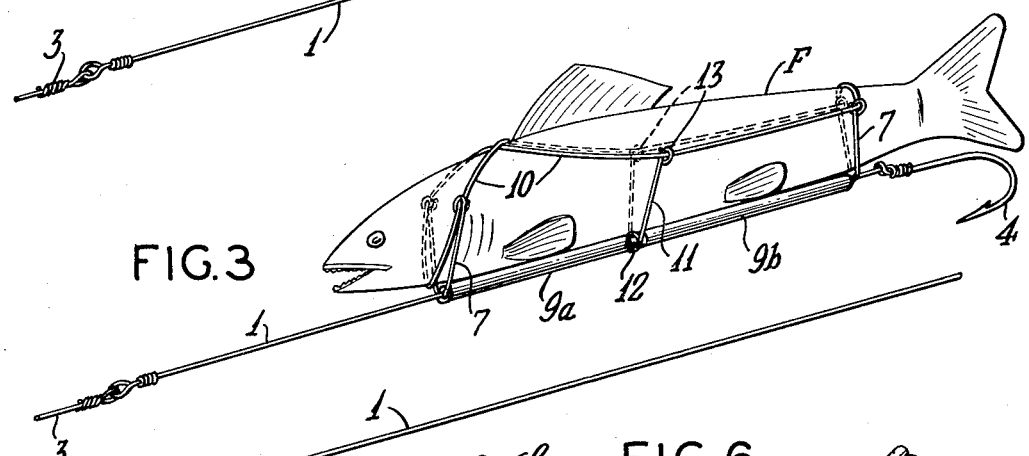
FIG. 3
FIG. 4
FIG. 6
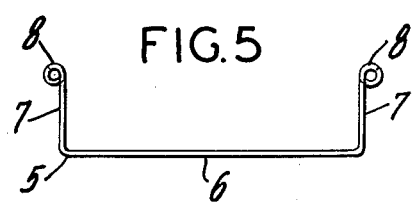
FIG. 5
INVENTOR.
WILLIAM E. GOURLAY
BY Cornelius Zabriskie
ATTORNEY.

3,047,976
LIVE BAIT HOLDER
William E. Gourlay, Amenia Union, Dutchess County,
Wassaic, N.Y.
Filed Apr. 18, 1961, Ser. No. 103,933
4 Claims. (Cl. 43—44.4)

This invention is a holder for live bait and constitutes an improvement over the holder forming the subject matter of my Patent No. 2,974,436, issued March 14, 1961.

That patent discloses a holder fabricated from wires of different lengths so twisted and mutually interbent with respect to one another and with a fish hook as to form a saddle for the live bait, with the hook permanently attached to the saddle and provided with an eye to which a fish line may be tied. An elastic band is used as a harness to hold the bait in the saddle in such manner that such bait, e.g., a minnow, may partake of its normal movement, when the device is in use.

The resulting structure is conveniently used by fishermen and has been found to be a mighty fine and effective lure. However, the amount of wire used, the number of bends of such wire, and the skill required in its making, renders it more expensive than is desirable. Furthermore, the fish hook is permanently built into the holder. This makes it impossible for the "real fisherman" to exercise his individual skillful choice of hooks for different kinds of fishing.

The object of the present invention is to very materially simplify the structure of my former holder so that it may be more easily and economically fabricated and to also make it possible and convenient for the user to utilize therewith a hook or hooks of his own choice.

These objects are accomplished by the use of less wire, the elimination of all intertwisting of the wire strands, the utilization of few parts of extremely simple form, and the use of simple jigs in the forming of individual elements of the structure.

Fundamentally and in its preferred form, the present holder may be made from three lengths of wire held in assembled relation by a short piece of tubing, shaped and assembled as hereinafter described and utilizing a conventional elastic band to bind the bait thereto.

Features of the invention, other than those adverted to, will be apparent from the hereinafter detailed description and appended claims when read in conjunction with the accompanying drawing.

The accompanying drawing illustrates one practical embodiment of the invention, but the construction therein shown is to be understood as illustrative, only, and not as defining the limits of the invention.

FIG. 1 is a perspective view showing a bait holder embodying the present invention with a portion of the length of the tube broken away so as to show the side by side relation of the wires which are enclosed therein.

FIG. 2 shows a bait holder of the kind illustrated in FIG. 1 with a live bait associated therewith and held in place by an elastic band.

FIG. 3 shows a modified form of the invention as it may be used for a larger bait than shown in FIG. 2.

FIG. 4 shows the foundation wire of the bait of the preceding figures.

FIG. 5 shows one of two like saddle members which are associated with the foundation wire.

FIG. 6 is a section on the line 6—6 of FIG. 1.

The holder of this invention embodies a foundation wire 1 such as shown in FIG. 4. Its forward end is twisted to form an eye 2 to which the fishing line 3 may be tied. Its opposite end is adapted to be passed through the eye of a fish hook 4 and twisted around the hook to anchor the hook thereto. The hook may be of the usual single barbed variety as shown or a triple type hook with barbs which the fisherman may at times desire to employ.

Associated with the foundation wire 1 are two identical saddle members 5, such as shown in FIG. 5. These are substantially U-shaped in form with a flat base 6 and upstanding arms 7, the free ends of which are curled as at 8. These two saddle members are preferably of wire and are positioned side by side longitudinally of the foundation wire 1 with their flat bases enclosed within a tube 9 which preferably extends for the full length of the flat bottoms of these members, so as to enclose said flat bottoms thereof and the contiguous portion of the foundation wire, as shown best in FIGS. 1 and 6. The saddle members are thus mounted on the foundation wire in proper relation to one another and in a manner to permit pivotal movement of the saddle members with respect to one another and to the foundation wire.

The live bait, shown in FIG. 2 of the drawings as a minnow f, is adapted to be placed upon the tube 9 and the saddle members then moved into engagement with the opposite sides of the bait after which an elastic band 10 is passed over the bait in any desired manner and engaged with the curled ends 8 of the saddle members to function as a harness whereby the bait is firmly bound in the resulting saddle in such manner as to permit natural swimming movement of the minnow in the water when the device is in use. The elastic band is shown in FIG. 1 as crossed over the top of the minnow so as to leave the dorsal fin free for movement although in practice the fisherman may use such elastic band in any configuration which his individual skill may dictate.

In the modified form of the invention shown in FIG. 3, an extra length of wire 11 is shown as curled at 12 about the tube 9 intermediate the ends of the latter or about the wires which are enclosed in the tube and between separate lengths of tube 9a and 9b, with the free ends of the wire bent upwardly and curled at 13. This extra length of wire may be used when the bait is of a much larger size, as indicated at F, to preclude the bait from wiggling sufficiently to free it from the saddle in which it rests. The elastic band 10 in this instance is adapted to be engaged with the curls 13 of the auxiliary saddle wire 11, as shown in FIG. 3.

In practice the holder is preferably marketed with a hook attached to the rear end of the foundation wire, but if the purchaser desires he can readily detach this hook and substitute therefor a hook of a different size or character as he may wish. Furthermore, if the fisherman desires to use a snell hook, he may thread the snell through the tube and loop it about the foundation wire at the forward end of the tube and at the same time form and twist the rear end of the foundation wire around the snell so that said foundation wire will not pull through the tube.

The device of this invention may thus be used in various ways by the fisherman, the fundamental aspect of the invention being the use of the foundation wire with the U-shaped saddle members each of which, in effect, constitutes a spreader with arms at each end provided with loops or curls for engaging the harness. Any desired type of hook, either with an attaching eye or a snell, may be employed as desired.

The device of this invention is extremely simple in construction, economical to manufacture and fulfills the same purpose as the live bait holder of my prior patent.

The foregoing detailed description sets forth the invention in its preferred practical form, but the invention is to be understood as fully commensurate with the appended claims.

Having thus fully described the invention, what I claim as new and desire to secure by Letters Patent is:

1. A live bait holder comprising: a foundation wire one end of which is adapted for attachment to a fishing line while its opposite end is adapted for attachment to a barbed fish hook, an elongated tube loosely embracing said foundation wire intermediate the ends of said foundation wire, a pair of substantially U-shaped saddle members the bases of which are straight and pass loosely through said tube in juxtaposed side by side relation with one another and the portion of the foundation wire within the tube, said saddle members being otherwise free from attachment to one another or to the hook or to the foundation wire and being wholly free for bodily pivotal movement with respect to the tube and the foundation wire and to each other, and a harness, the free ends of said saddle members being curled for engagement with said harness which is adapted to overlie and attach a live bait supported by the saddle members.

2. A live bait holder according to claim 1, wherein the harness is an elastic band.

3. A live bait holder according to claim 1, comprising an auxiliary saddle member embodying a wire curled about the wires which pass through the tube intermediate the ends of said saddle members with the free ends of the auxiliary saddle member curled for additional engagement with the harness.

4. A live bait holder according to claim 3, wherein the harness is an elastic band.

References Cited in the file of this patent

UNITED STATES PATENTS 2,974,436     Gourlay _____ Mar. 14, 1961

FOREIGN PATENTS 367,701     Great Britain _____ Feb. 25, 1932
408,096     Great Britain _____ Apr. 5, 1934